(12) United States Patent
Oglesby et al.

(10) Patent No.: US 8,966,295 B2
(45) Date of Patent: Feb. 24, 2015

(54) APPARATUS AND METHOD FOR CONTROLLING TRANSFER OF POWER BETWEEN ENERGY STORAGE DEVICES THROUGH A CONVERTER

(75) Inventors: Jane Oglesby, San Jose, CA (US); Henry W. Koertzen, Olympia, WA (US); Stephen C. Fenwick, Ashland, OR (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 13/538,169

(22) Filed: Jun. 29, 2012

(65) Prior Publication Data

US 2014/0006807 A1    Jan. 2, 2014

(51) Int. Cl.
  *G06F 1/00*   (2006.01)
  *H02J 9/00*   (2006.01)
  *H02J 7/00*   (2006.01)

(52) U.S. Cl.
  USPC ............................. 713/300; 307/64; 320/103

(58) Field of Classification Search
  USPC ........................................................ 713/300
  See application file for complete search history.

(56) References Cited

U.S. PATENT DOCUMENTS

| | | | | |
|---|---|---|---|---|
| 6,396,772 B1 * | 5/2002 | Yabe et al. | ..................... | 368/204 |
| 7,084,525 B2 * | 8/2006 | Rajashekara et al. | ........... | 307/82 |
| 7,728,546 B2 * | 6/2010 | Tanaka et al. | ................. | 320/104 |
| 7,939,969 B2 * | 5/2011 | Ichikawa et al. | ................ | 307/82 |
| 8,058,749 B2 * | 11/2011 | Radun | ............................. | 307/64 |
| 8,286,006 B2 * | 10/2012 | Kreiner et al. | ................ | 713/300 |
| 8,522,057 B2 * | 8/2013 | Kreiner et al. | ................ | 713/300 |

\* cited by examiner

*Primary Examiner* — Suresh Suryawanshi
(74) *Attorney, Agent, or Firm* — Ked & Associates

(57) ABSTRACT

A power manager includes a converter and a controller. The converter is coupled between first and second energy storage devices, and the controller controls transfer of power between the first and second energy storage devices through the converter. The first energy storage device is to supply power to a first power subsystem of an electronic device, and the second energy storage device is to supply power to a second power subsystem of the electronic device. The subsystem may have different operating voltage requirements. When a level of the second battery falls below a first reference value, the controller controls the transfer of power from the first energy storage device to the second energy storage device. A transfer of power in a reverse direction may occur when a level of the first energy storage device falls below a second reference value.

23 Claims, 8 Drawing Sheets

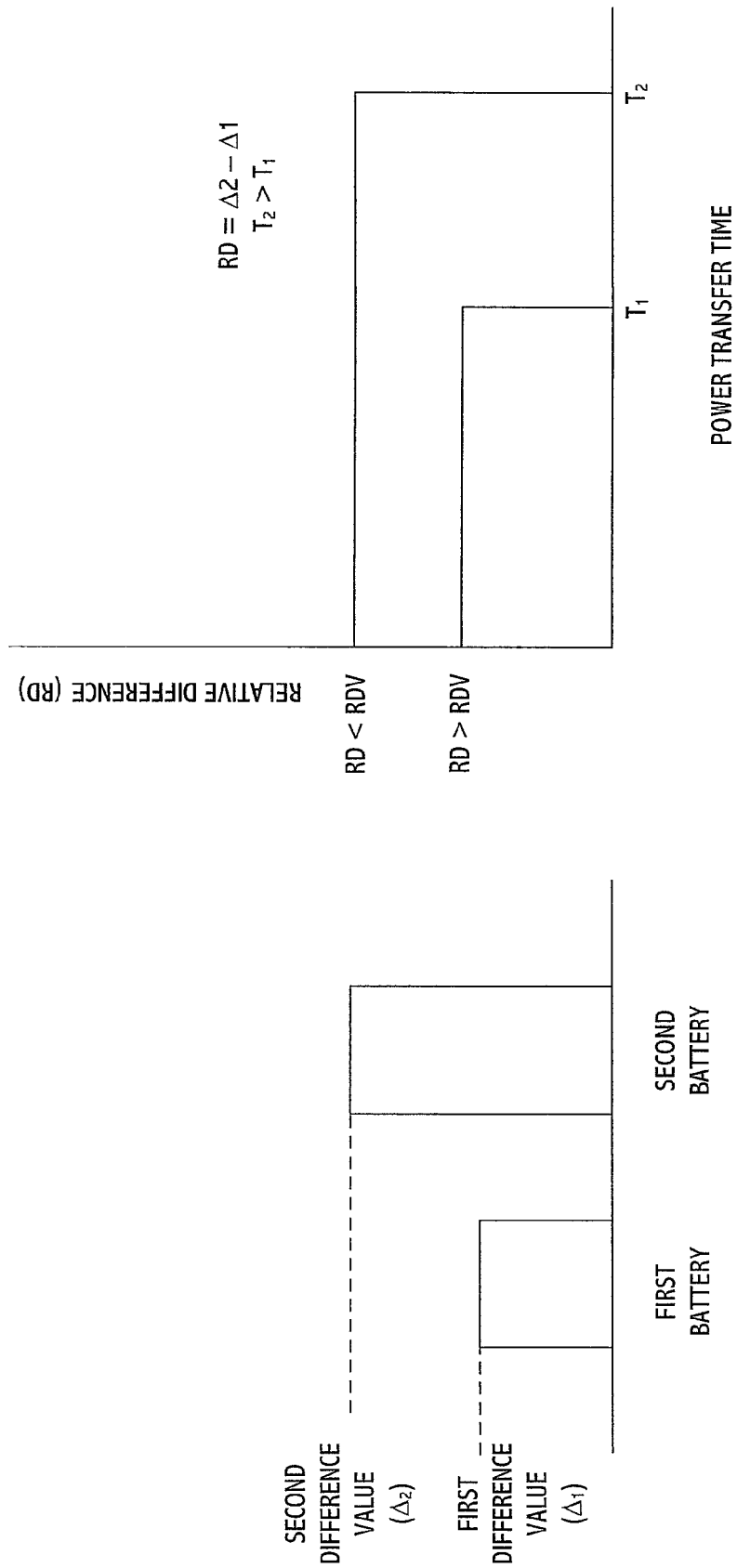

APPARATUS AND METHOD FOR CONTROLLING TRANSFER OF POWER BETWEEN ENERGY STORAGE DEVICES THROUGH A CONVERTER

FIELD

One or more embodiments herein relate to managing power in an electronic system.

BACKGROUND

Power management continues to be an area of interest for designers of electronic systems, especially those that are battery driven. One approach for extending the life of a battery involves changing the power state of various circuits and/or functions when not in immediate use. Other attempts involve using solar cells or other types of environmentally based power sources with a battery. While these approaches have proven useful for some applications, improvements and new approaches are required in the area of power management.

BRIEF DESCRIPTION OF THE DRAWINGS

FIGS. 3A and 3B are diagrams showing another way for transferring power between batteries based on time.

DETAILED DESCRIPTION

Figure 1:
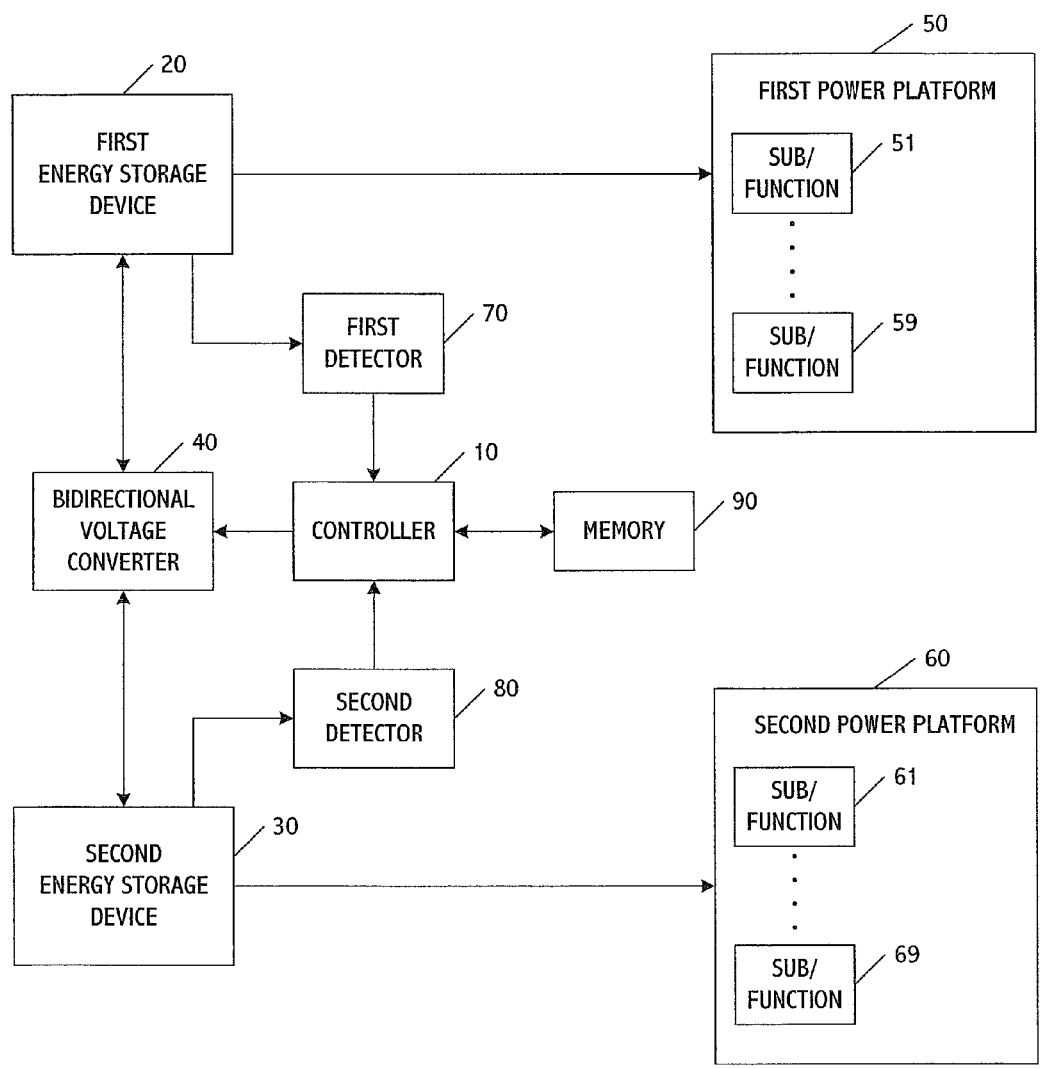
FIG. 1 is a diagram showing one embodiment of an apparatus for managing power in an electronic device.

FIG. 1 shows one embodiment of an apparatus for managing power in an electronic device or system. The electronic device or system may be any type of stationary, portable, or mobile device including but not limited to notebook or hand-held computers, smart phones, pad- or pod-type devices, media players, navigation systems, information devices, gaming apparatuses and/or their controllers, cameras and/or video recorders, or other types of battery-driven devices. For the sake of illustration, the electronic device will be discussed as corresponding to a mobile device in this embodiment.

The apparatus includes a controller 10, a first energy storage device 20, and a second energy storage device 30. In accordance with one embodiment, the first and second energy storage devices may be batteries. However, in other embodiments, one or both of these storage devices may be non-battery-type energy storage devices. Purely for the sake of illustration, the energy storage devices will be discussed as batteries in the description that follows.

The controller performs a variety of power management operations for the mobile device including controlling the transfer of power between the batteries based on predetermined conditions. The controller may correspond to a central processor of the mobile device or a processor that is designed to operate separately or independent from the central processor. In other embodiments, the controller may operate under control of the central processor, depending, for example, on the firmware or other control software programmed into the device. Structurally, the controller may be mounted on a system board or built into a battery pack or housing of the device.

The first battery supplies power to at least a first power subsystem 50 of the device. The first power subsystem may receive this power within a first predetermined voltage range and may include one or a plurality of subsystems or functions 51 to 59 to be performed by the device. Additionally, or alternatively, one or more voltage regulators may be included in advance of one or more of the functions or subsystems in order to convert the power received from the first battery into one or more predetermined voltage ranges, in the event that further power control is required.

The second battery supplies power to at least a second power subsystem 60 of the device. The second power subsystem may receive this power within a second predetermined voltage range and may include one or a plurality of subsystems or functions 61 to 69 to be performed by the device. Additionally, or alternatively, one or more voltage regulators may be included in advance of one or more of the functions or subsystems to convert the power from the second battery into predetermined voltage ranges in the event that further power control is required.

The first predetermined voltage range and the second predetermined voltage range may be different. According to one embodiment, these voltage ranges may overlap one another with one range subsumed completely within the other range or with one range only partially overlapping the other range. According to another embodiment, the first and second voltage ranges are non-overlapping ranges, with the first voltage range handling higher power requirements of the device and the second range handling lower power requirements.

In operation, the controller 10 outputs a control signal to the bidirectional voltage converter 40 to transfer power between the first and second batteries. The power transfer to be performed is determined based on one or more predetermined factors determined, for example, based on a power management strategy programmed into the control software of the device. This software may be stored, for example, in memory 90 coupled for access by controller 10.

According to one application of this strategy, the controller may output its control signal to converter 40 based on signals received from detectors 70 and 80. The signals from these detectors may provide an indication of the remaining power levels in respective ones of the first and second batteries.

Because the batteries control different subsystems (functions and/or subsystems) of the device, it is possible for a more active one of the subsystems to consume power more rapidly than the other subsystem. For example, in idle state, the communication circuits of the device may still be in operation. The circuits of the second subsystem (e.g., display, camera, speakerphone, Bluetooth connectivity, Wireless Fidelity (WiFi) connectivity, etc.), however, may not be in use and therefore the power in the first battery will be consumed at a much faster rate than power in the second battery. This situation may be expected to produce an imbalance, with one battery having a greater power level than the other battery.

If the power level of the first battery falls below a minimum reference value, then operation of the entire device may be shut down even though substantial power may exist in the second battery. Conversely, when the peripheral functions of the device are in heavy use, the power of the second battery may be depleted faster than the first battery power. Continued depletion of the second battery power may also cause shut down of the device. The controller 10 takes these and other scenarios into consideration when controlling transfer of power between the batteries.

More specifically, the controller operates to control power transfer between the first and second batteries in order to extend operation of the device. This may be accomplished by having the controller compare battery power level signals received from the detectors to respective reference values. Based on these comparisons, the controller may effect a transfer of power from one battery to the other.

In one embodiment, the transfer of power from one battery to the other may require a voltage conversion. The voltage conversion may be performed by bidirectional voltage converter 40, which, for example, may control the transfer rate and/or place the transferred power in a form or format compatible with the power-receiving battery. The voltage converter may be any one of a number of DC-to-DC voltage converter circuits. The voltage converter, thus, may effectively operate as a charging circuit for charging the power level of one battery with power from the other battery.

According to one embodiment, the converter may only operate to transfer power between the batteries, without providing any peak power for the subsystems from a source independent from the batteries. This way, the size of the converter may be kept relatively small to promote miniaturization. In another embodiment, the converter may supplement the power transferred between the batteries with power from another or independent source, including but not limited to power from a USB cable, from an environmental source, or an external power source.

The transfer of power from one battery to the other may be accomplished in a variety of ways. One way for transferring power involves outputting power from converter 40 for a predetermined time. For example, referring to FIG. 2A, in the case where the battery power level of the first battery (FBL) is below a first reference value (FRV) and the battery power level of the second battery (SBL) is above a second reference value (SRV), the power may be transferred from the second battery to the first battery, through converter 40, for a first time $T_1$ as shown in FIG. 2B.

Figures 2A, 2B:
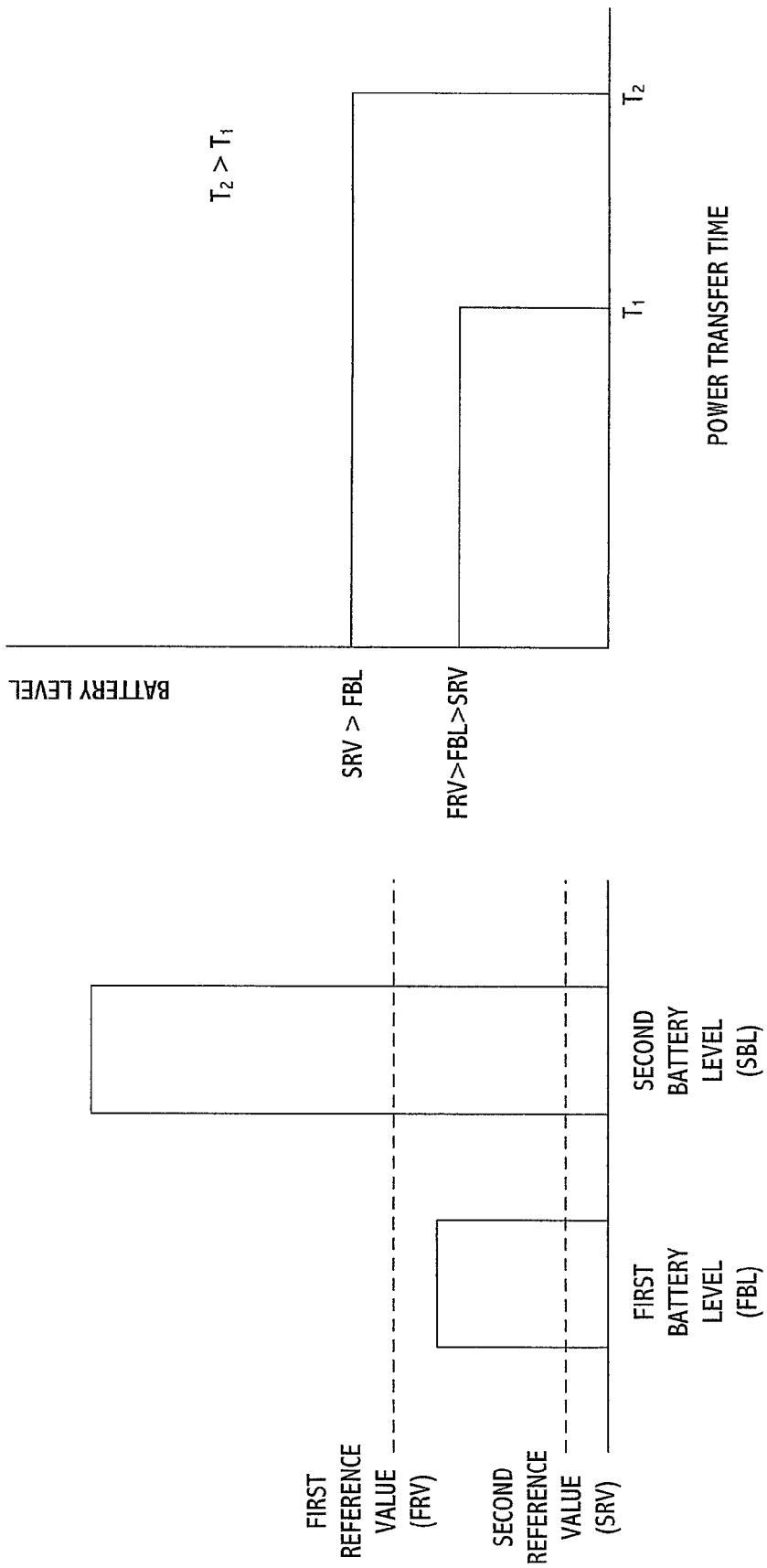
FIGS. 2A and 2B are diagrams showing one way for transferring power between batteries based on time.

As also shown in FIG. 2B, in the case where the battery power level of the first battery is less than both the first and second reference values, the power may be transferred from the second battery to the first battery, through converter 40, for a second time $T_2$, where $T_2 > T_1$.

In accordance with one embodiment, the controller may prevent a power transfer from taking place between the batteries when the second battery level is below the first reference value or the second reference value, irrespective of the first battery power level. In another embodiment, the controller may allow the battery power transfer to take place if the second battery power level is between the first and second reference values. The reference values for the first and second batteries may be the same or different.

In another embodiment, the power transfer time may be a predetermined fixed time based on relative differences between the power levels of each battery and their respective reference values. For example, as shown in FIG. 3A, a first difference value ($\Delta_1$) may correspond to a difference between the first battery power level and a first reference value. A second difference value ($\Delta_2$) may correspond to a difference between the second battery power level and a second reference value. A relative difference (RD) may then be computed based on a difference between the first and second difference values.

When the relative difference exceeds a predetermined relative difference value (RDV), then power may be transferred from the second battery to the first battery (if the second battery has more power than the first battery) for a first fixed time $T_1$. When the relative difference is less than the predetermined relative difference value, then power may be transferred from the second battery to the first battery for a second fixed time $T_2$ which is greater than the first fixed time $T_1$. In accordance with one or more embodiments, power transfer may be performed based on a plurality of reference values and/or fixed times programmed into the control software to be applied based on the signals output from detectors 70 and 80.

Figure 4:
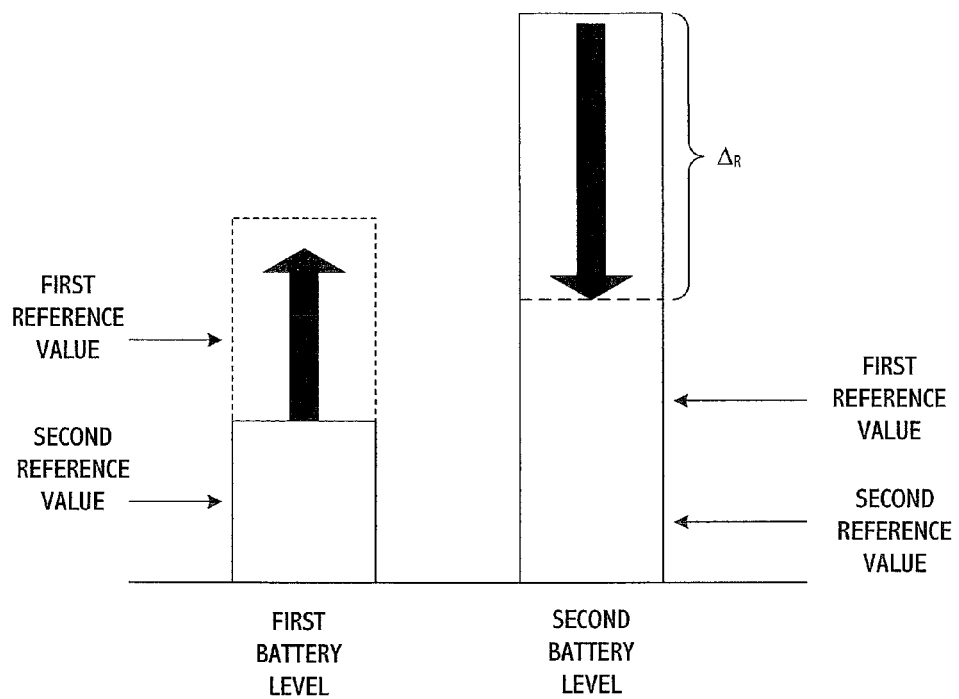
FIG. 4 is a diagram showing one way for transferring power between batteries based the power level of the transferring battery.

According to another embodiment, power transfer between the batteries may be controlled based on relative battery power levels. For example, as shown in FIG. 4, when the first battery power falls below a first reference value but is above a second reference value (lower than the first reference value) and the second battery level is above its first and second reference values, power may be transferred from the second battery to the first battery until a signal is received from detector 80 indicating that the power in the second battery has been reduced by a predetermined amount ($\Delta_R$) or to a predetermined level.

This predetermined amount or level may be above the first reference value of the second battery (or another preset amount of level) to ensure that the functions and subsystems driven by the second battery may still operate. When the first battery level is at a critically low level (e.g., below its second reference value), a greater amount of power may be transferred from the second battery to the first battery (e.g., to below its first or second reference value) to ensure continued operation of the first power subsystem functions and/or subsystems, even at the expense of losing functionality of one or more functions or subsystems of the second power subsystem caused by an insufficient power level of the second battery.

In other embodiments, power from the first battery may be transferred to the second battery in an analogous manner, e.g., until the power level of the first battery has been depleted by a predetermined amount or to a predetermined level which may be above or below the first reference value. In this way, the continued availability and operation of the functions and/or subsystems of the second power subsystem may be maintained for an extended period of time. This scenario may result when, for example, the user of the mobile device is playing a game and therefore prefers continued play of the game over messaging and/or communication functions.

Through the power management strategy employed by controller 10, power from one battery may be transferred to the other battery to extend subsystem operation to thereby prevent the device from shutting down when a substantial amount of power still exists in one of the batteries. In this strategy, the reference values of the first and second batteries may be different, depending, for example, on anticipated power consumption levels for respective one of the power subsystems and/or based on a priority of the continuation operability of one power subsystem over the other. In another embodiment, the reference values of the first and second batteries may be the same in order to take a more balanced approach.

Referring back to FIG. 1, according to one exemplary application, the first battery may be a carbon-anode lithium ion battery which supplies power in a range sufficient to satisfy peak power, high minimum voltage loads and/or higher operating voltages of the functions or subsystems in the first power subsystem. Examples of the functions and/or subsystems in the first power subsystem having higher operating voltage requirements include communication (transmitter and/or receiver) circuits, central processor, and/or one or more graphics processors.

The second battery may be may be a silicon-anode battery which supplies power to one or more remaining functions and/or subsystems of the device. These functions and/or subsystems (e.g., the second power subsystem) may have a lower operating voltage range than the first power subsystem and, as previously indicated, may power a camera, audio speakers, media player, short-range wireless connectivity, and/or other features of the device.

Figure 5:
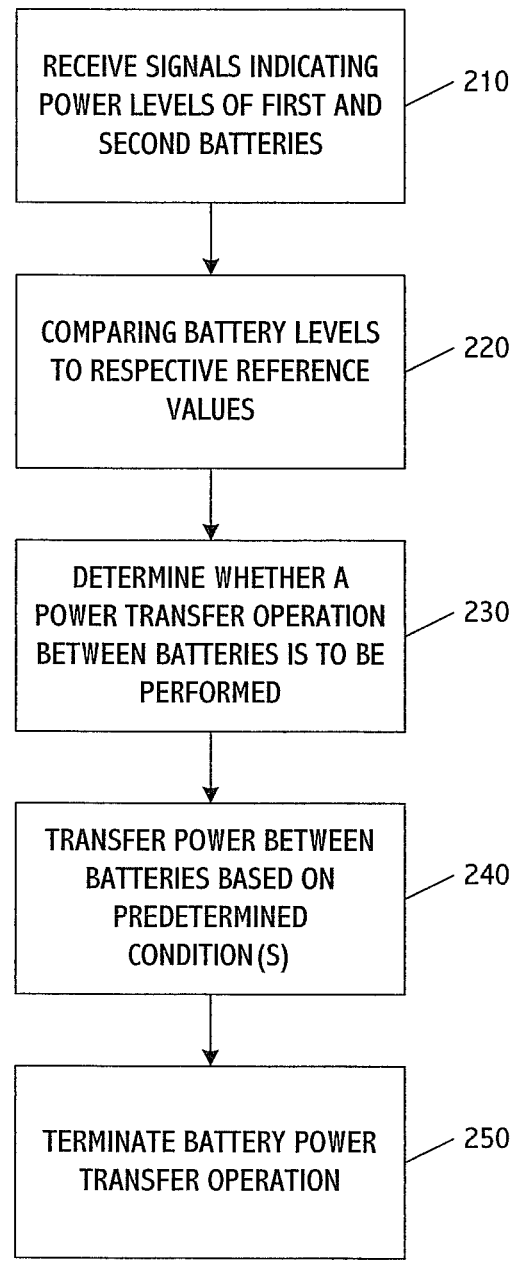
FIG. 5 is a diagram showing operations included in one embodiment of a method for controlling power in an electronic device, such as a mobile device.

FIG. 5 shows operations included in one embodiment of a method for controlling power in an electronic device, such as a mobile device. These operations may be performed by any of the apparatuses and/or systems previously discussed or a different apparatus or system. These operations may be automatically performed in a manner transparent to a user based on control software or may at least partially be controlled by one or more stored settings input by a user.

For example, the control software may be written to allow a user to enter information through an input device or graphical user interface to set a mode for controlling power transfer between the batteries. One setting may allow the user to specify a preference of functions or subsystems of one power subsystem over the functions or subsystems of another power subsystem. Another setting may cause the controller to initiate power transfer at the time a user signal is received designating that a power transfer should be performed. Another setting may allow a user to set one or more of the reference values or fixed times for controlling power transfer, such as the values or times shown in FIGS. 2 to 4.

In accordance with another embodiment, a user setting may be received and stored and/or the control software may be programmed to perform a power transfer in accordance with one or more of the aforementioned embodiments when only one or a subset of functions or subsystems of a given power subsystem enters a power saving mode or which otherwise reaches a critical power level. For example, the firmware of some mobile devices may automatically lower the brightness of a display when a certain battery power level exists.

The display may be included in a power subsystem that controls the camera and/or other features of the device. When this one feature (display brightness) is approaching a critical power level, the control software or a user setting may be stored to initiate a power transfer even though other functions or subsystems on the same subsystem maintain their full capability.

Referring to FIG. 5, an initial operation of the method may include receiving signals indicative of the power levels of first and second batteries. (Block 210). The signals may be generated, for example, by the detectors shown in FIG. 1 or by an additional sensing system. For example, in the case where the mobile device is a notebook, pad- or pod-type device, monitoring software stored in the device may continuously operate to monitor the power levels of the batteries.

In the case where the controller and/or converter 40 is located in a battery pack provided in a housing separate from and coupled to the device, the controller and/or converter may include detectors such as shown in FIG. 1. The detector signals may then be sent to the controller inside the battery pack or included in the device for processing in order to determine whether a power transfer is to be performed.

Once the battery level signals are received, the battery levels are compared to respective reference values. (Block 220). The comparison may be performed, for example, using any of the ways described in relation to FIGS. 2, 3, and 4. For example, each level may be compared to one or more respective reference values or a difference value may be computed based on this level and reference value.

Based on this comparison, a determination is made as to whether a power transfer operation between the batteries is to be performed. (Block 230). Because the converter 40 between the batteries is a bidirectional converter, power from any one of the batteries may be converted and transferred for storage in the other battery. The determination of whether a power transfer operation is to be performed may, once again, be determined according to any of the techniques shown in FIGS. 2, 3, and 4.

Once it has been determined that a power transfer operation is to be performed, power is transferred from one of the batteries to the other based on one or more predetermined conditions. (Block 24). The one or more conditions may correspond to a fixed time, based on a depletion level of voltage in the battery transferring the power, or a combination thereof as explained with reference to FIGS. 2, 3, and 4.

Once the one or more conditions have been satisfied, the battery transfer operation is terminated. (Block 250). The transfer of power from one battery to the other allows for operation of the functions or subsystems in the power subsystem of the battery which received the power to be extended, which has the effect of extending the usability of the overall device.

In accordance with another embodiment, a non-transitory computer-readable medium may be provided to store control software for performing any portion or all of the operations described in accordance with the aforementioned embodiments. The computer-readable medium may correspond to memory 90 shown in FIG. 1 or may correspond to another type of storage device. As explained, the control software may be executed by controller 40, which, for example, may be stored in a battery pack or may be mounted on a printed circuit board found in the device.

Figure 6:
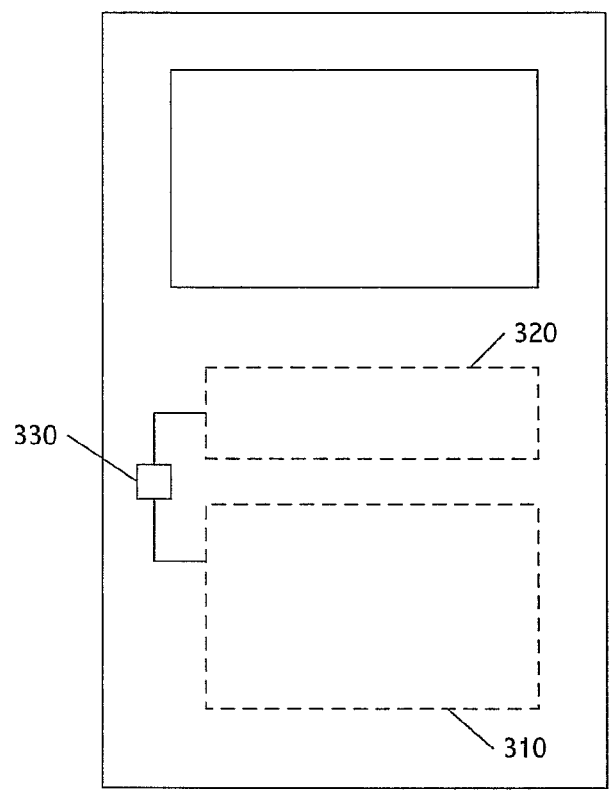
FIG. 6 is a diagram showing an example of a mobile device including an apparatus for managing power in accordance with the embodiments described herein.

FIG. 6 shows one type of electronic device in the form of a smartphone that is equipped with the apparatus for controlling power transfer between batteries. In this exemplary application, the smartphone includes a carbon-anode lithium-ion battery 310 provided independently from a silicon-anode battery 320. The batteries are coupled by a converter 330 which perforans a power-transfer operation under control of a controller such as described in relation to one or more previous embodiments. In this embodiment, the controller is provided as part of the control circuits of the smartphone and is not included in a battery pack.

Figure 7:
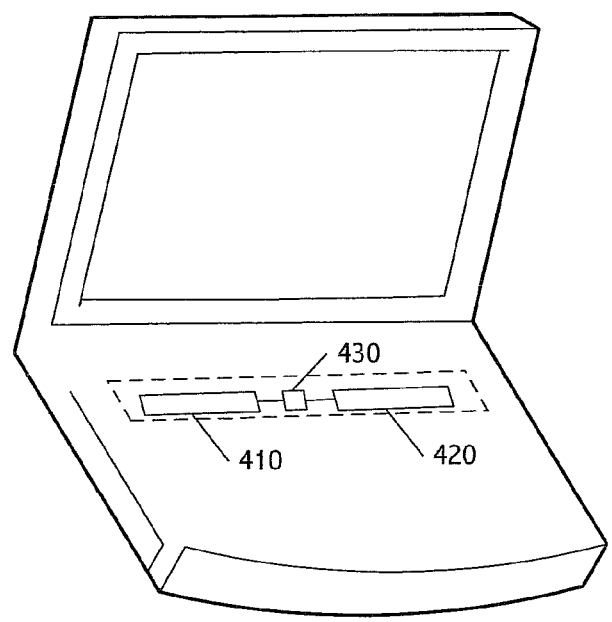
FIG. 7 is a diagram showing an example of a battery pack including an apparatus for managing power in accordance with the embodiments described herein.

FIG. 7 shows another type of electronic device in the form of a notebook computer that is equipped with an apparatus for controlling power transfer between batteries. In this application, the notebook computer includes a carbon-anode lithium-ion battery 410 provided independently from a silicon-anode battery 420. The batteries are coupled by a converter 430 which performs a power-transfer operation under control of a controller such as described in relation to one or more previous embodiments. However, unlike FIG. 6, the controller and converter are provided in a battery pack that is removably attached to the computer.

Figure 8:
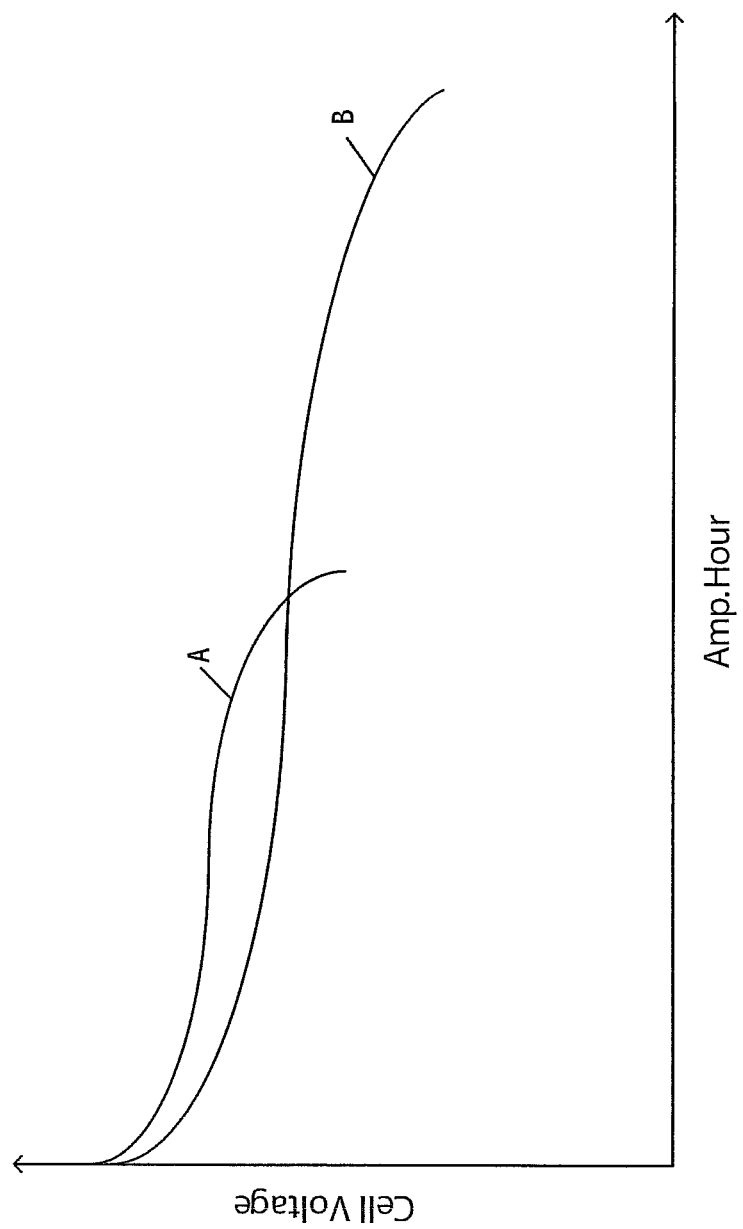
FIG. 8 shows an example of a bidirectional converter that may be included in any of the embodiments of the apparatus for managing power.

FIG. 8 shows an example of a bidirectional converter for use in transferring power between batteries in accordance with one or more of the aforementioned embodiments. In this example, first battery is a carbon-anode lithium-ion battery and the second battery is a silicon-anode battery. The silicon-anode battery may, for example, also be one type of lithium ion battery.

Figure 9:
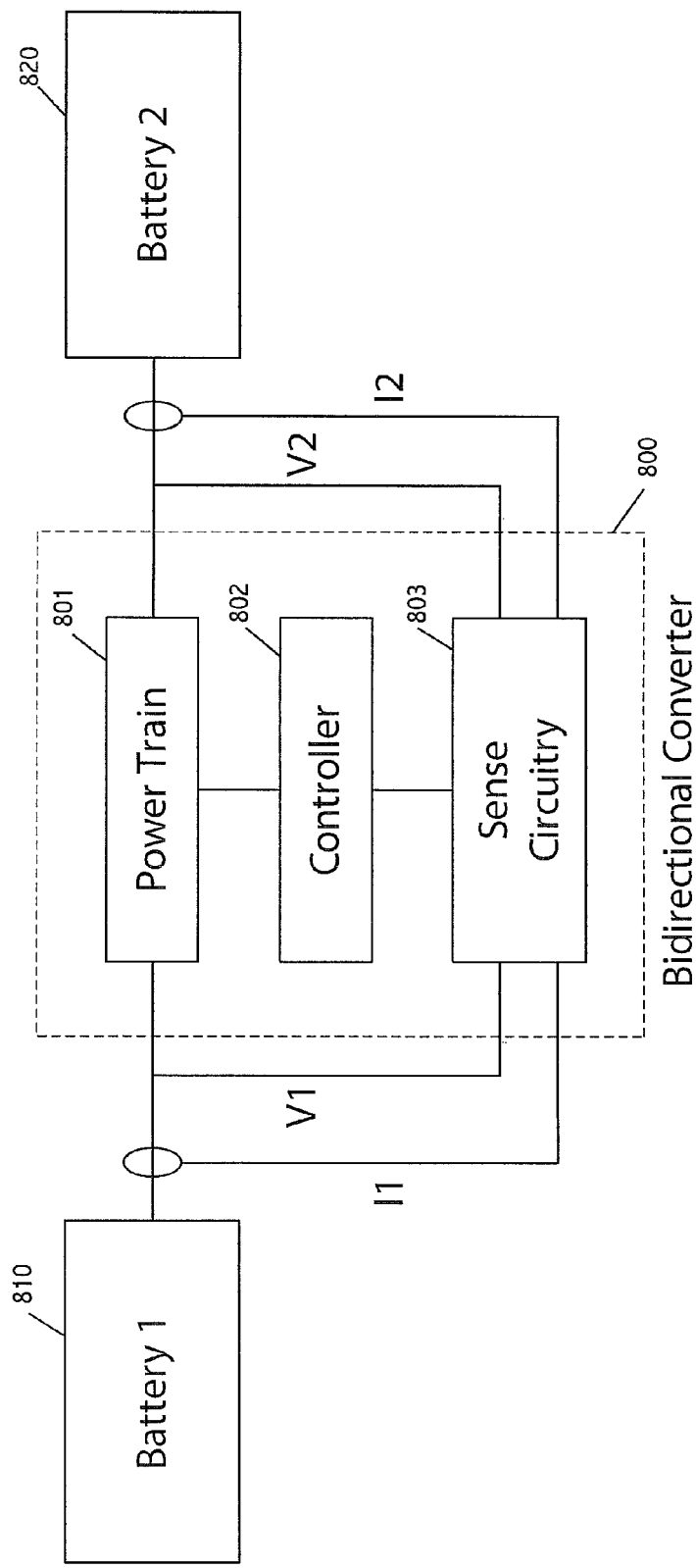
FIG. 9 shows discharge curves for two batteries that are to be controlled based on one or more of the aforementioned embodiments.

As shown in FIG. 9, the bidirectional converter 800 includes a power train 801, a controller 802, and a sense circuit 803. The sense circuit receives a first set of signals indicative of the current ($I_1$) and voltage ($V_1$) of the first battery 810 and a second set of signals indicative of the current ($I_2$) and voltage ($V_2$) of the second battery 820.

The sense circuit sends information based on these signals to the controller, which determines whether the power from one battery needs to be transferred to the other battery, e.g., whether one battery needs to be charged based on power from the other battery. This determination may be made by the controller, for example, based on the cell voltages of the batteries, coulomb counting of the remaining charge in the batteries, or a combination thereof.

Once the controller has made the determination that power is to be transferred from one battery to another, the controller may enable the power train and perform closed-loop control of the duty cycle of one or more switches to set the direction of power transfer and the rate of charging to take place. According to one example, the converter may have a four-switch buck-boost topology to set the direction of power transfer and/or rate of charging. In other embodiments, a different topology may be used. The controller may include or be coupled to a memory or other information storage device for storing reference values for use in performing power transfer.

FIG. 8 is a graph showing one example of discharge curves that may correspond to different batteries, which, for example, may correspond to the batteries in FIG. 8 or other ones of the drawings. In this example, the first battery 810 may be a lithium-ion battery having a higher cell voltage but lower charge density compared to the second battery 820, which may be a silicon-anode battery. As shown in the graph, the discharge curve A indicates that the first battery may have a faster discharge rate compared with the second battery, whose discharge rate is shown by curve B.

In accordance with another embodiment, the apparatus of FIG. 1 or any of the other aforementioned embodiments may be applied to control transfer of power between a battery and another type of storage device, or between storage devices which are not batteries. These other storage devices may include, for example, capacitors or ultra- or super-capacitors, inductors, or other non-battery types of devices which are capable of storing power (e.g., voltage and/or current). Such embodiments may be suitable, for example, for mobile or information devices as well as hybrid cars or other systems that employ multiple power sources.

In accordance with another embodiment, one or more power subsystems of the electronic system may be able to operate based on power from sources other than the energy storage devices subject to power transfer as described herein. These other power sources may include generators, alternating current (AC) power such as, for example, from a wall outlet, solar cells, or other environmental or non-environmental sources.

In accordance with one or more embodiments, the power subsystems of the electronic system may be distinct or independent from one another or may be combined or otherwise integrated. Also, the electronic system subject to power management may be a device which requires high voltages on a rail for some operations and/or modes and lower voltages for other rails and/or modes. In such an application, power from either energy storage device may be used to supply the higher and lower voltages required.

In one or more of the foregoing embodiments, power transfer takes place between two energy storage devices. However, in other embodiments, power transfer may take place between or among three or more energy storage devices. This transfer may be controlled, for example, based on a commensurate number of reference values and the transfer among the energy storage devices may take place in multiple stages in order to satisfy the requirements of the system.

As an example of the foregoing embodiment, consider a system that includes three energy storage devices. In such a system, energy from the first storage device may be transferred to the second storage device in a first amount and a second amount (greater or less than the first amount) may be transferred from the second energy storage device to the third energy storage device. This multi-stage transfer may be performed, for example, when the power level in the third energy storage device falls below a predetermined threshold level or based on other conditions. Such a multi-stage embodiment may have any of a variety of topologies including a ring topology, a matrix topology, or a star topology as well as others.

In alternative embodiments, the detectors such as shown, for example, in FIG. 1 may be discrete units or the detection functions may be performed by the controller and/or one or more of the energy storage devices, or a combination of these approaches may be implemented.

Also, in one embodiment, a network of energy storage devices (e.g., batteries) may be integrated with one or more corresponding detectors and controllers. Software may then be used to collaboratively determine which power subsystem or function of the system is to be power by which energy storage device.

Also, power management in accordance with any of the embodiments described herein may be performed while the device or system is operating in a standby (or other lower power) mode when a primary (e.g., AC wall power) is unavailable. Also, while power transfer has been discussed as being bidirectional, in other embodiments power transfer may only be unidirectional.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, the features of any one embodiment described herein may be combined with the features of one or more other embodiments to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An apparatus comprising:
a converter to be coupled between first and second energy storage devices; and
a controller to control transfer of power between the first energy storage device and the second energy storage device through the converter, wherein the first energy storage device is to supply power to a first power subsystem that is to operate in a first voltage range, the second energy storage device is to supply power to a second power subsystem that is to operate in a second voltage range, and the controller is to control the transfer of power from the first energy storage device to the second energy storage device in response to a level of the second energy storage device being below a first reference value, and
the controller is to:
determine a first difference value based on a difference between the level of the second energy storage device and the first reference value,
determine a second difference value based on a difference between a level of the first energy storage device and a second reference value, and
control transfer of power based on the first difference value and the second difference value.

2. The apparatus of claim 1, wherein the controller is to control the transfer of power from the second energy storage device to the first energy storage device in response to the level of the first energy storage device being below the second reference value.

3. The apparatus of claim 2, wherein the first reference value is different from the second reference value.

4. The apparatus of claim 1, wherein the first predetermined voltage range does not overlap the second predetermined voltage range.

5. The apparatus of claim 1, wherein the controller is to control the transfer of power from the first energy storage device to the second energy storage device for a fixed time.

6. The apparatus of claim 5, wherein the controller is to control the transfer of power from the first energy storage device to the second energy storage device for a first fixed time in response to the level of the second energy storage device being in a first voltage range and is to control the transfer of power from the first energy storage device to the second energy storage device for a second fixed time in response to the level of the second energy storage device being in a second voltage range.

7. The apparatus of claim 1, wherein the controller is to prevent the transfer of power from the first energy storage device to the second energy storage device in response to the level of the first energy storage device falling below the second reference value.

8. The apparatus of claim 7, wherein the second reference value is different from the first reference value.

9. The apparatus of claim 1, wherein the controller is to control transfer of power from the first energy storage device to the second energy storage device for a first predetermined time in response to a relative difference value being in a first difference range and is to control transfer of power from the first energy storage device to the second energy storage device for a second predetermined time in response to the relative difference value being in a second difference range, and wherein the relative difference value is to be based on a difference between the first and second difference values.

10. The apparatus of claim 1, wherein the controller is to control the transfer of power from the first energy storage device to the second energy storage device based on a level of power in the first energy storage device.

11. The apparatus of claim 10, wherein the controller is to control the transfer of power from the first energy storage device to the second energy storage device for a time taken to reduce power in the first energy storage device by a predetermined amount.

12. The apparatus of claim 10, wherein the controller is to control the transfer of power from the first energy storage device to the second energy storage device for a time taken to reduce power in the first energy storage device to a predetermined level.

13. The apparatus of claim 1, wherein the first energy storage device is one of a carbon-anode lithium-ion battery or a silicon-anode battery and the second energy storage device is the other one of the carbon-anode lithium ion battery or the silicon-anode battery.

14. A converter comprising:
a first node coupled to a first energy storage device;
a second node coupled to a second energy storage device; and
a circuit to transfer power between the first and second energy storage devices,
wherein the circuit is to convert power from the first energy storage device to a form compatible for input into the second energy storage device in response to a power level of the second energy storage device being below a first reference value and wherein the circuit is to convert power from the second energy storage device to a form compatible for input into the first energy storage device in response to a power level of the first energy storage device being below a second reference value, and
the circuit is to control transfer of power based on a first difference value and a second difference value, the first difference value being based on a difference between the level of the second energy storage device and the first reference value, and the second difference value being based on a difference between the level of the first energy storage device and a second reference value.

15. The converter of claim 14, wherein the first reference value is different from the second reference value.

16. The converter of claim 14, wherein the circuit is to transfer converted power from the first energy storage device to the second energy storage device for a fixed time.

17. The converter of claim 16, wherein the circuit is to transfer converted power from the first energy storage device to the second energy storage device for a first fixed time in response to a level of the second energy storage device being in a first voltage range and is to transfer converted power from the first energy storage device to the second energy storage device for a second fixed time in response to a level of the second energy storage device being in a second voltage range.

18. The converter of claim 14, wherein the circuit is to transfer converted power from the first energy storage device to the second energy storage device based on a level of power in the first energy storage device.

19. The converter of claim 14, wherein the first energy storage device is one of a carbon-anode lithium-ion battery or a silicon-anode battery and the second energy storage device is the other one of the carbon-anode lithium ion battery or the silicon-anode battery.

20. An apparatus comprising:
a controller to control transfer of power between a first energy storage device and a second energy storage device through a converter, wherein:
the first energy storage device is to supply power to a first power subsystem that is to operate in a first voltage range,
the second energy storage device is to supply power to a second power subsystem that is to operate in a second voltage range, and
the controller is to control the transfer of power from the first energy storage device to the second energy storage device in response to a level of the second energy storage device being below a first reference value, and
the controller is to:
determine a first difference value based on a difference between the level of the second energy storage device and the first reference value,
determine a second difference value based on a difference between a level of the first energy storage device and a second reference value, and
control transfer of power based on the first difference value and the second difference value.

21. The apparatus of claim 20, wherein the controller is to control the transfer of power from the second energy storage device to the first battery in response to a level of the first energy storage device being below the second reference value.

22. The apparatus of claim 21, wherein the first reference value is different from the second reference value.

23. The apparatus of claim 20, wherein the controller is to control transfer of power from the first energy storage device to the second energy storage device for a first predetermined time in response to a relative difference value being in a first difference range and is to control transfer of power from the first energy storage device to the second energy storage device for a second predetermined time in response to the relative difference value being in a second difference range, and wherein the relative difference value is to be based on a difference between the first and second difference values.

* * * * *